United States Patent [19]
Pinder et al.

[11] Patent Number: 6,086,377
[45] Date of Patent: Jul. 11, 2000

[54] SYSTEM AND METHOD FOR PRODUCT AND SERVICE CONFIGURATION

[75] Inventors: Ronald S. Pinder; Patricia A. Stolte, both of Ottawa, Canada

[73] Assignee: Nortel Networks Corporation, Canada

[21] Appl. No.: 08/854,266

[22] Filed: May 9, 1997

[51] Int. Cl.[7] .............................. G09B 19/00; G09B 5/00; G09B 3/00; G09B 25/00
[52] U.S. Cl. ...................... 434/118; 434/307 R; 434/322; 434/379
[58] Field of Search ................................. 434/118, 307 R, 434/307 A, 322, 379

[56] References Cited

U.S. PATENT DOCUMENTS

| | | | |
|---|---|---|---|
| 5,036,472 | 7/1991 | Buckley et al. | 442/293 |
| 5,243,174 | 9/1993 | Veeneman et al. | 235/381 |
| 5,606,443 | 2/1997 | Sgambati | 359/143 |
| 5,724,102 | 3/1998 | Harrison et al. | 348/552 |
| 5,760,771 | 6/1998 | Blonder et al. | 345/336 |
| 5,813,863 | 9/1998 | Sloane et al. | 434/236 |
| 5,870,683 | 2/1999 | Wells et al. | 455/566 |

FOREIGN PATENT DOCUMENTS

| | | |
|---|---|---|
| 0 669 748 | 8/1995 | European Pat. Off. . |
| 6334933 | 2/1994 | Japan . |

OTHER PUBLICATIONS

Blue Mountain Arts Electronic Greeting Cards, HTTP://www2.bluemountain.com, Dec. 1996.

Hallmark, "Microsoft Greetings Workshop", HTTP://www.hallmark.com/connections_bin/greet.html.

Bank of America, "Home Banking", HTTP://www.bankamerica.com/.

Sand Hill Engineering Inc., "Xtension", HTTP://www.shed.com/about.html.

*Primary Examiner*—Robert A. Hafer
*Assistant Examiner*—John Edmund Rovnak
*Attorney, Agent, or Firm*—Finnegan, Henderson, Farabow, Garrett & Dunner, L.L.P.

[57] ABSTRACT

A method and system for demonstrating the context of features of a product or service, receiving selections of those features from a user, and modifying the demonstration to show the consequences of the received selections.

42 Claims, 11 Drawing Sheets

SYSTEM AND METHOD FOR PRODUCT AND SERVICE CONFIGURATION

BACKGROUND OF THE INVENTION

The present invention relates generally to configuring product and service features, and more specifically to integrating demonstration and configuration of the features.

Many products and services attempt to provide benefit to consumers through programmable features. As the number of these features increases, however, the product or service often becomes increasingly difficult to understand and use. Typical VCRs, for example, allow for significant flexibility in programmed recording, tape editing, and channel programming. With this increased flexibility, however, has come thicker and more complex instruction manuals for the user to decipher to understand and use the product's capabilities. Often, a poor interface between the consumer and the product compounds the problem. With the VCR, for example, the consumer must use a complex remote control to access various features and enter information. The process can be tedious and frustrating.

This tension between increased programmability and increased complexity has ramifications other than end-user confusion. First, a consumer may be reluctant to purchase products, perhaps because in retail outlets, he finds it difficult to grasp and appreciate all the features of a particular product and, thus, difficult to assess whether the product meets his needs.

One way to avoid this problem is for retail outlets to have working displays of products. Even if outlets are willing to incur such an expense, a consumer may still have to read the manual or engage in lengthy discussions with a salesperson to understand the features of the product. Then, even if the consumer purchased the product, he would have to apply the information learned at the outlet at home with his own product. Therefore, if the consumer had programmed a display model of the product, he would have to repeat the programming for the unit he actually purchased. This requires the consumer to expend more time and energy understanding and programming the product with the additional complication that the programming interface at home may be different from that used in the retail outlet.

Not only do as these problems exist for the consumer, they exist for the retailers as well. Retailers must devote significant time and money educating their salespeople about products, who in turn must educate consumers. In addition, the outlet may end up serving as a "help line" for consumers who have questions about the products they purchased. All these expenses increase overhead and reduce profits. They also increase the time it takes to sell a particular product, which has further ramifications on the supplier or manufacturer.

The same problems exist with services, as they do with products. To increase their flexibility, for example, telephone companies often offer a barrage of telephone services including, for example, call waiting, call return, call answer, and caller ID. A user has the same difficulties managing these services as he would managing the features of a product. For example, users can choose various features for call answer (such as the number of rings before answering, types of greetings, etc.), or set various blocking features with caller ID. As with products, a consumer must educate himself about these services to see if the services meet the consumer's needs and to enable the consumer to understand and fully use these features of the services.

A poor understanding of the features often results in a returned product or canceled service. Additionally, the service providers (here, the telephone companies) must incur expense to educate their support personnel and consumers. This involves not just the initial sale of the services, but also ongoing support and customization that the consumer must perform through the telephone company.

In light of the foregoing, there is a need for a system to interface with consumers that expedites their education and understanding of product or service features while capturing the consumer's preferred configuration for the product or service.

SUMMARY OF THE INVENTION

Accordingly, systems and methods consistent with the present invention substantially obviate the problems and disadvantages that accompany programmable products and services. For example, such systems and methods integrate product promotion and education with the input of configuration data to make products and services easier to sell and use. This has a number of advantages including cost savings for the seller since the consumer can easily configure his own products and services, and increased product or service loyalty by the consumer.

In accordance with the purpose of the invention, as embodied and broadly described, a system consistent with this invention includes means for presenting a programmed demonstration of the product or service, means for receiving selections from a user indicating settings for features of the product or service, means for modifying the programmed demonstration according to the received selections, and means for recording the received selections.

A method consistent with this invention includes the steps of presenting a programmed demonstration of the product or service, receiving selections from a user indicating settings for features of the product or service, modifying the programmed demonstration according to the received selections, and recording the received selections.

Another system consistent with this invention includes means for presenting one or more programmed demonstrations showing the context for features of the configurable element, means for presenting with the demonstrations one or more sets of selectable features of the configurable element, means for receiving selections of features in the sets from a user, and means for modifying the programmed demonstration to show the consequences of the received selections.

Another method consistent with this invention includes presenting one or more programmed demonstrations showing the context for features of the configurable element, presenting with the demonstrations one or more sets of selectable features of the configurable element, receiving selections of features in the sets from a user, and modifying the programmed demonstration to show the consequences of the received selections.

An article of manufacture consistent with this invention includes a first module for causing a system to present a programmed demonstration of a configurable element, a second module for causing the system to receive selections from a user indicating settings for features of the configurable element, a third module for causing the system to modify the programmed demonstration according to the received selections, and a fourth module for causing the system to record the received selections.

Other features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

Both the foregoing general description and the following detailed description are exemplary and explanatory only, and are intended to provide further explanation of the invention as claimed. The accompanying drawings provide a further understanding of the invention and are incorporated in and constitute a part of this specification. They illustrate embodiments of the invention, and together with the description serve to explain the principles of the invention.

DETAILED DESCRIPTION

Figure 1:
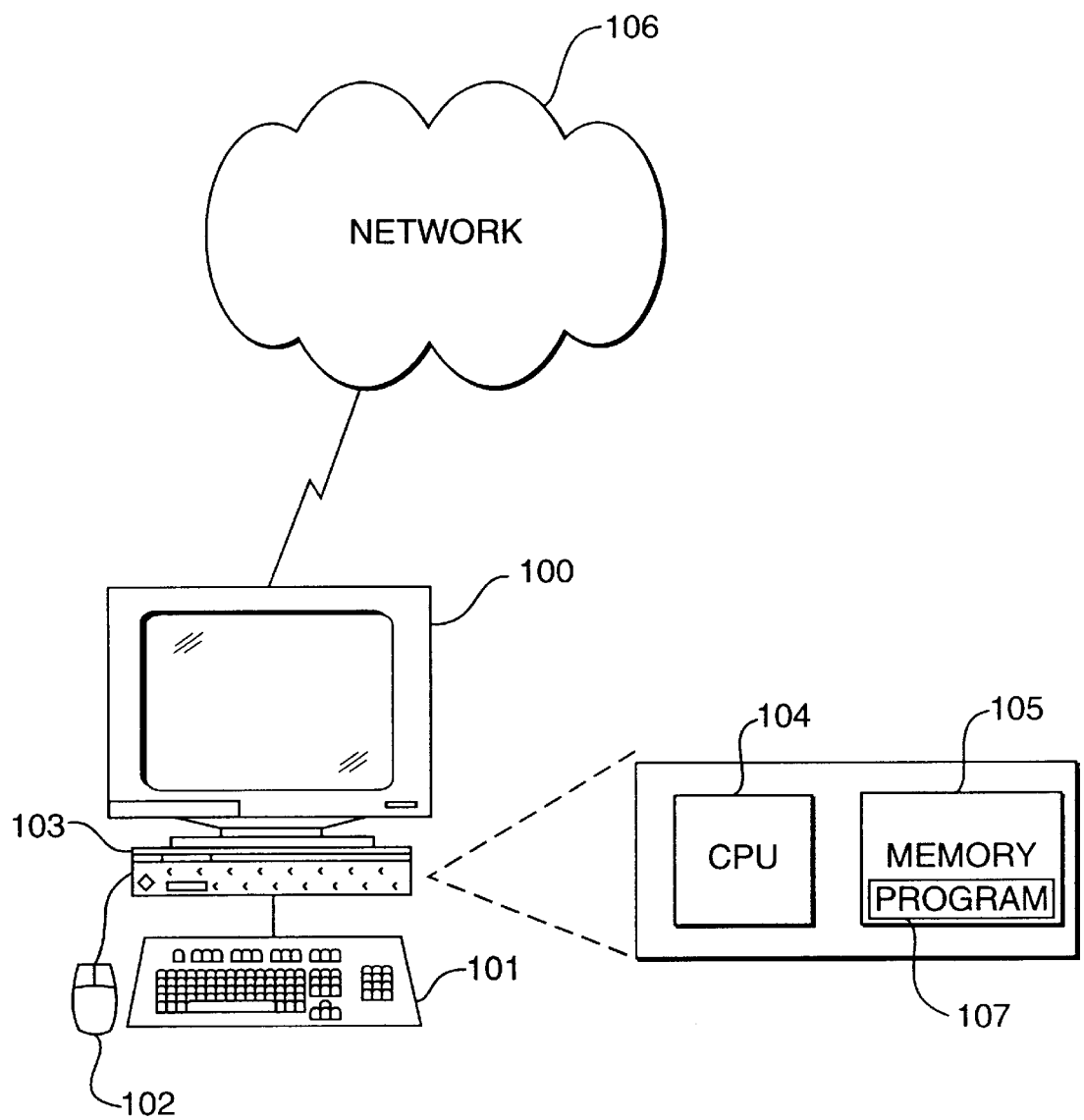
FIG. 1 is a diagram showing a computer system consistent with an implementation of the present invention.

Reference will now be made in detail to the present preferred embodiments of the invention, an example of which is illustrated in the accompanying drawings. Wherever possible, the same reference numbers will be used throughout the drawings to refer to the same or like parts.

A. OVERVIEW

The software program implementing the present invention can take on a number of forms depending on the type of product or service ("configurable element") it is designed to support. Generally, the program integrates product promotion and education with input of configuration and administration data in such a way that the program can be used in the pre-sale promotional and post-sale setup phases for programmable products and services. To achieve this integration, the program has a multi-faceted user interface to change interactive promotional material to a practical setup tool for configuration, administration, and ordering of the product or service. The program, therefore, interacts with a user and can interact with a product or service to select its programmable features.

In one embodiment, the seller would have a personal or networked computer running the program at the point of sale. At this point, the program's primary purpose is to educate the consumer about the product or service and its features. Preferably, the program interacts with the user through illustrated stories. The stories are interactive vignettes designed to illustrate features of the product or service. Since the program is acting as a promotional tool, it is important that it engages the consumer while providing information about the product or service. The stories, then, should be fun and entertaining.

Functionally, the stories are written to clearly demonstrate the impact of programmable features by showing scenarios that illustrate the effect the programmable features have for the user. The story includes a range of programmable features available for that product or service. As the user proceeds through the story, he can change the settings and see the effect of the settings in the story. The program has separate stories illustrating various features or groups of features of the product or service. In sum, the stories show the context for the various features of the product or service and demonstrate the consequences associated with user selections of those features.

Having educated himself about the product or service, the consumer may wish to purchase it. Since the consumer has already selected the features of interest, it would be inefficient and time consuming to require the consumer to reenter of the settings for these features. Therefore, the program stores the settings entered by the consumer during the demonstration of the product or service. The consumer would then take a copy of the program with the stored settings with him on, for example, a floppy disk or CD ROM, or store the settings in the seller's machine or in a network for later download by the consumer.

As mentioned above, the program is configured to physically interact with the product or service to change its features. So, having purchased the product or service, the consumer continues to use the program to adjust the features of the product or service as desired. The consumer can reuse the settings entered in the promotional/pre-sale phase to program the actual product or service. This saves the consumer's time and eliminates the need to learn a new configuration interface to choose the features the consumer desires. If the particular product or service does not support automated configuration, the program could generate a hard copy of the settings entered by the consumer for quick reference during programming. The hard copy would serve as custom end-user documentation for the product or service.

As the consumer becomes more familiar with the product or service, he may want a faster way to access the features of the device without proceeding through the illustrated stories. If, through use of the stories, the consumer has learned to program the features of the product or service with its normal interface, he may interact with the product or service directly. Or, the program can display a summary of an individual story concisely showing the features illustrated in that story, or a summary of all stories and their features. The summaries provide speedy access to the programmable features of the product or service. Of course, the consumer could continue to use the stories to learn about previously unused features or to refresh his understanding of features already programmed. Alternatively, the consumer may use the stories to refresh his recollection of the activated options and settings, or troubleshoot and diagnose problems with the product or service.

In the embodiment discussed above, the seller runs the program at the point of sale—in a kiosk at a retail outlet, for example. The program has much wider application, however. The program may also be used on a promotional diskette or CD as part of a direct mailing or included with a magazine. The consumer could use the program at home to learn about and evaluate the product or service. The program would allow the consumer to order the product or service by modem link or otherwise. As before, when the consumer receives the product or service, the settings saved by the program are available to the consumer to quickly configure the product or service.

In another embodiment, the program could run at an Internet web site or on a direct dial-in service such as a bulletin board system. A consumer wanting to learn more about a product would visit the site or BBS and use the program remotely. For example, a telephone company could configure the program to support and tie in with its calling features such as call waiting, call return, call answer, etc. A consumer would educate himself about the services through the illustrated stories and could sign up for the services online. The consumer could then use the settings entered while he educated himself to program the services, or alter the programmable features of the services through the program. The settings could then be used by the telephone company as that consumer's service profile.

In another embodiment, the program could run on a private intranet or client server in, say, a corporation. The user could use the program to learn about and self-administer voice or data network services such as telephony features, video conferencing, file sharing, and group work administration, or otherwise modify his user profile.

The program could also be used to educate the consumer and capture settings for the benefit of the supplier. The settings are forwarded by a communication link to a manufacturer or supplier who can configure the product according to consumer's settings before sending the product to the distributor. Such a system would increase the efficiency of the distribution chain and, therefore, reduce costs as well as expedite delivery of products and services.

In addition, the product could be designed with processing capabilities to itself run the program. In this embodiment, there would be no need for a standalone computer. Instead, the program, operating through a display device, would interact with the consumer directly. For example, if the program was designed to support a television, the television would contain the necessary processing capabilities to run and display the interactive demonstration.

B. IMPLEMENTATION

FIG. 1 is a diagram of a system that can be used to carry out an implementation consistent with the present invention. Monitor 100 provides the principal display interface, and keyboard 101 and mouse 102 allow the user to provide inputs to a processing unit 103. Processing unit 103 includes a CPU 104 and memory 105 containing various programs and data, including program 107. Processing unit 103 can be connected to a network 106 of other computers, and information collected about products and services can be centrally stored. Program 107 runs the demonstration and collects the configuration data. In one embodiment, the present invention can be implemented in commercially available software such as Macromind Director running on a Macintosh or processing unit 103 can be contained within the product itself, thus obviating the need for a standalone computer.

Figure 2:
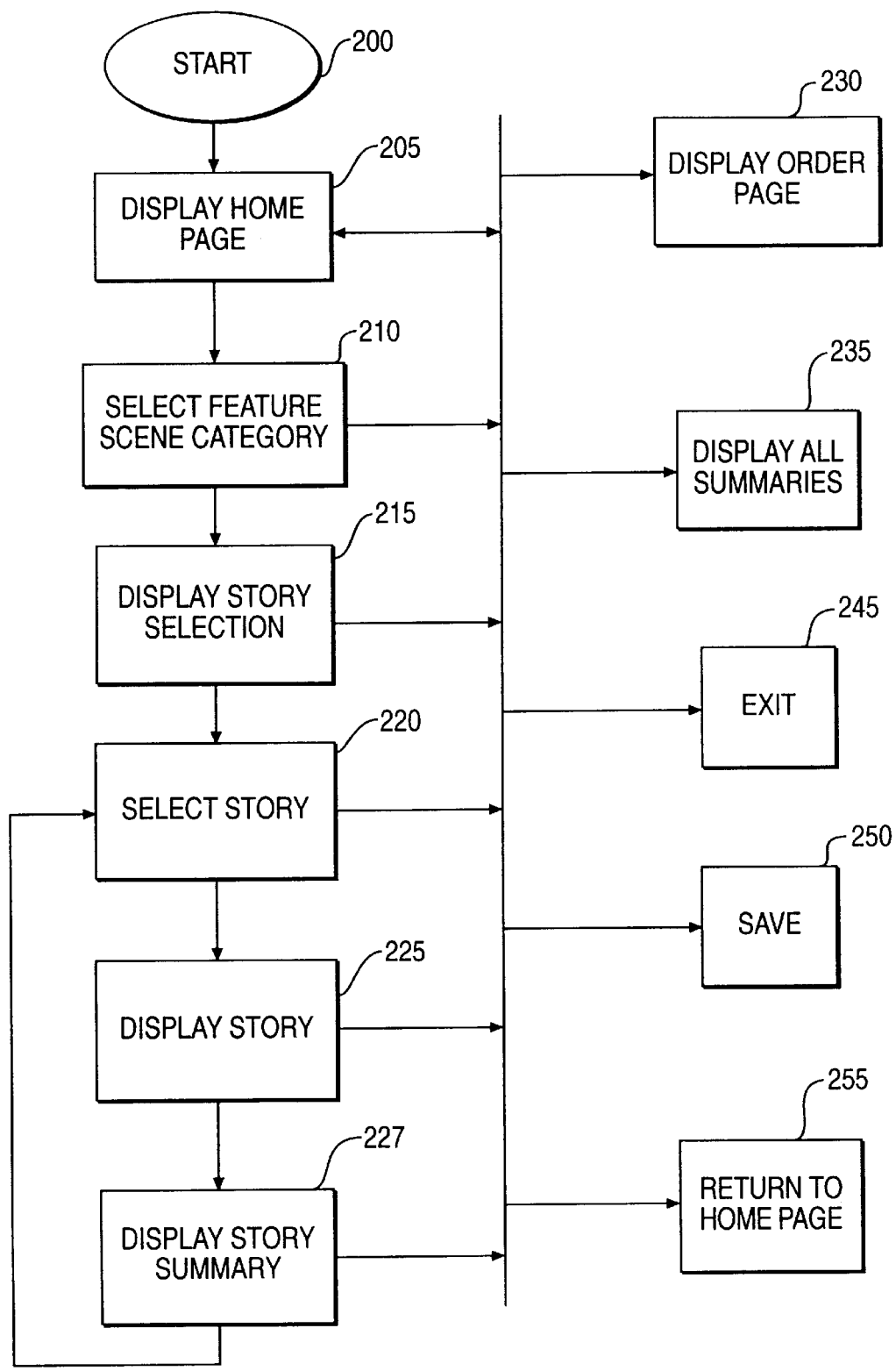
FIG. 2 is a generalized flowchart showing the logical steps consistent with an implementation of the present invention.
Figure 4:
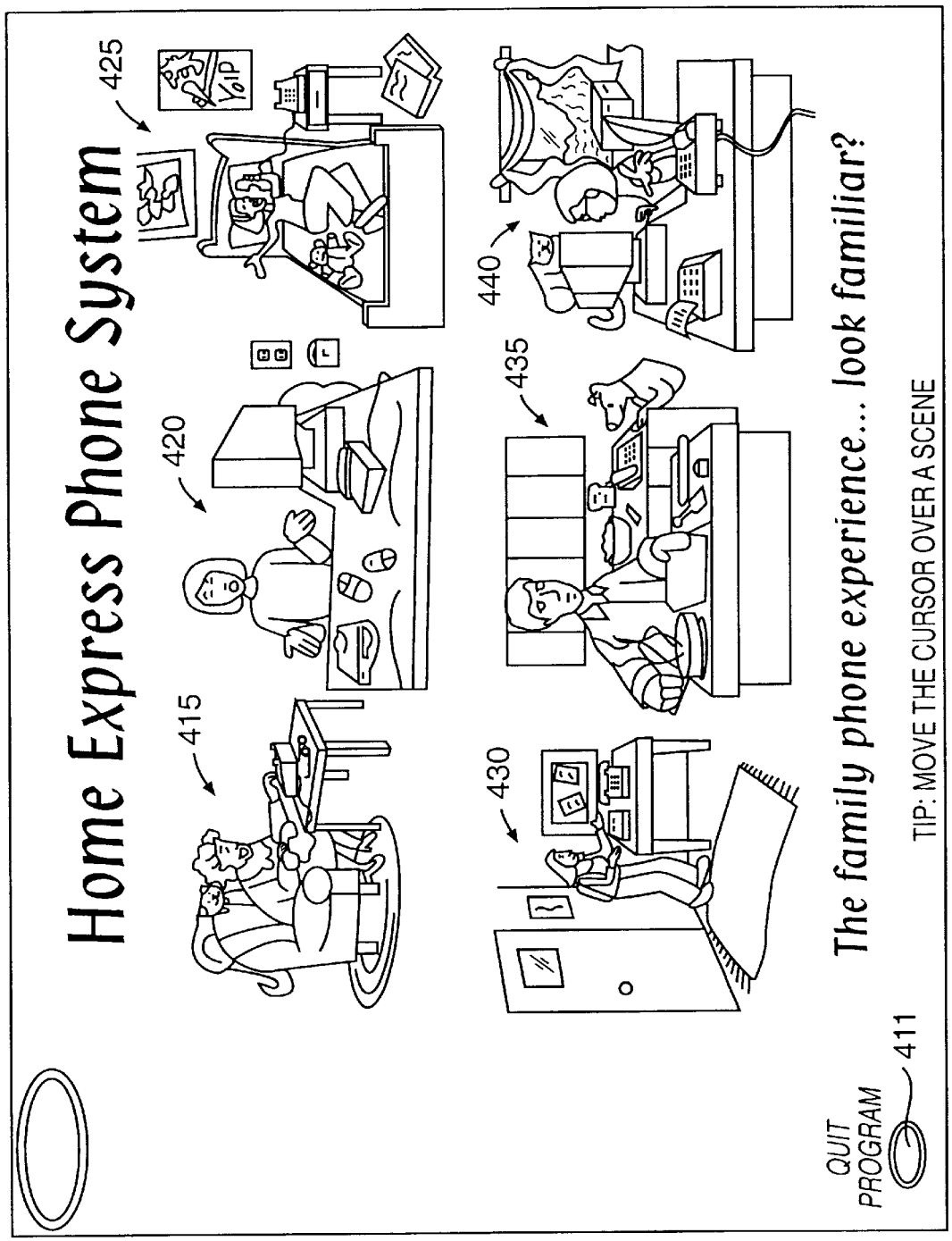
FIG. 4 is a drawing of a display of feature scene categories consistent with an implementation of the present invention.

FIG. 2 depicts a generalized flowchart showing the progression of program 107. After program 107 starts (step 200), it displays a "home page" (step 205). FIG. 4 shows an example of the home page of program 107. Although program 107 may support any product or service, for explanatory purposes program 107 is shown supporting a product that configures home telephone features. The home page shows six exemplary feature scene categories 415, 420, 425, 430, 435, and 440, each representing certain features of the product. When the user moves mouse 102 over a particular feature scene category, program 107 preferably displays a description of that feature scene category. The user selects one of these feature scene categories by clicking mouse 102 on a desired feature scene category (step 210). A user not interested in proceeding at this point may quit program 107 (step 245) by selecting a quit button 411 in the lower left corner of the screen.

Figure 5:
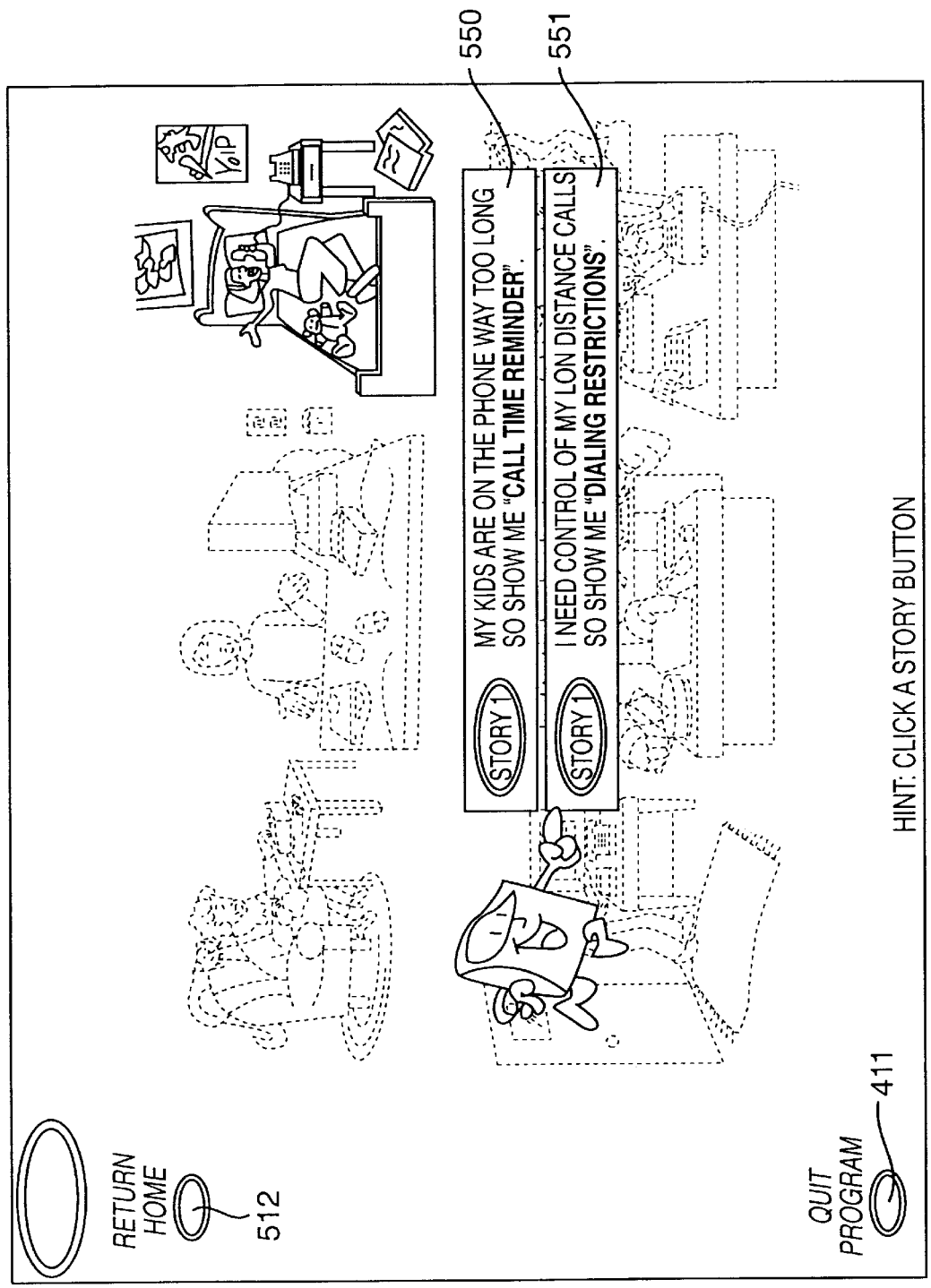
FIG. 5 is a drawing of a display of options presented when a particular feature scene category from FIG. 3 is selected.

If the user selects a feature scene category (step 210), program 107 prompts the user to choose a story (step 215) relating to certain features of the product. For example, if the user selects feature scene category 425, program 107 displays two story options as shown in FIG. 5. Story 550 relates to a feature called "Call time reminder" and story 551 relates to a feature called "Dialing restrictions." The user may select either of these stories (step 220), quit program 107 (step 245), or return to the home page by selecting return button 512 in the upper left hand corner of the page (step 255). The user may view as many of the stories as he wishes for any length of time, allowing for self-paced learning of the various features.

Figure 3:
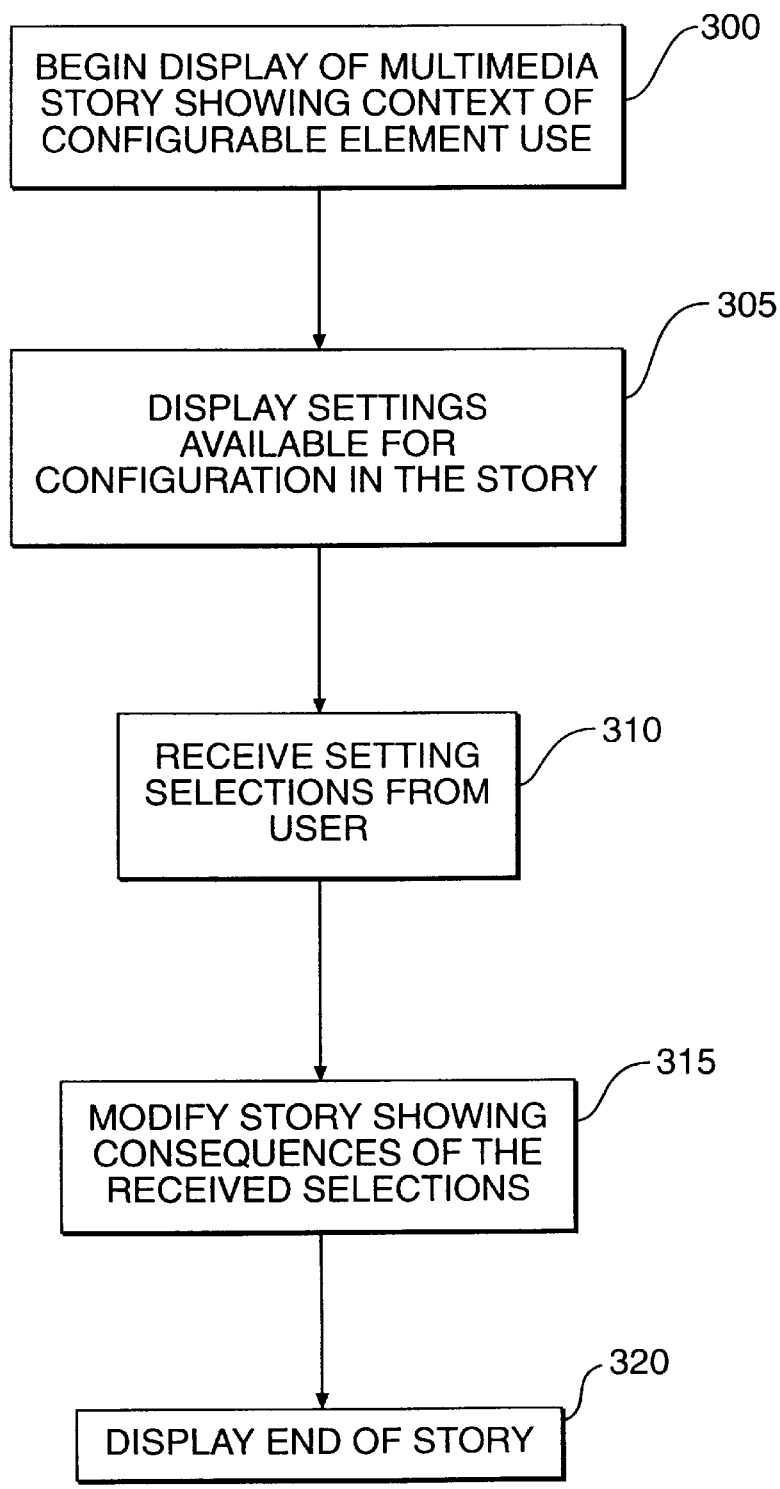
FIG. 3 is a flowchart showing more detail of the "Display Story" block of FIG. 2.
Figure 6:
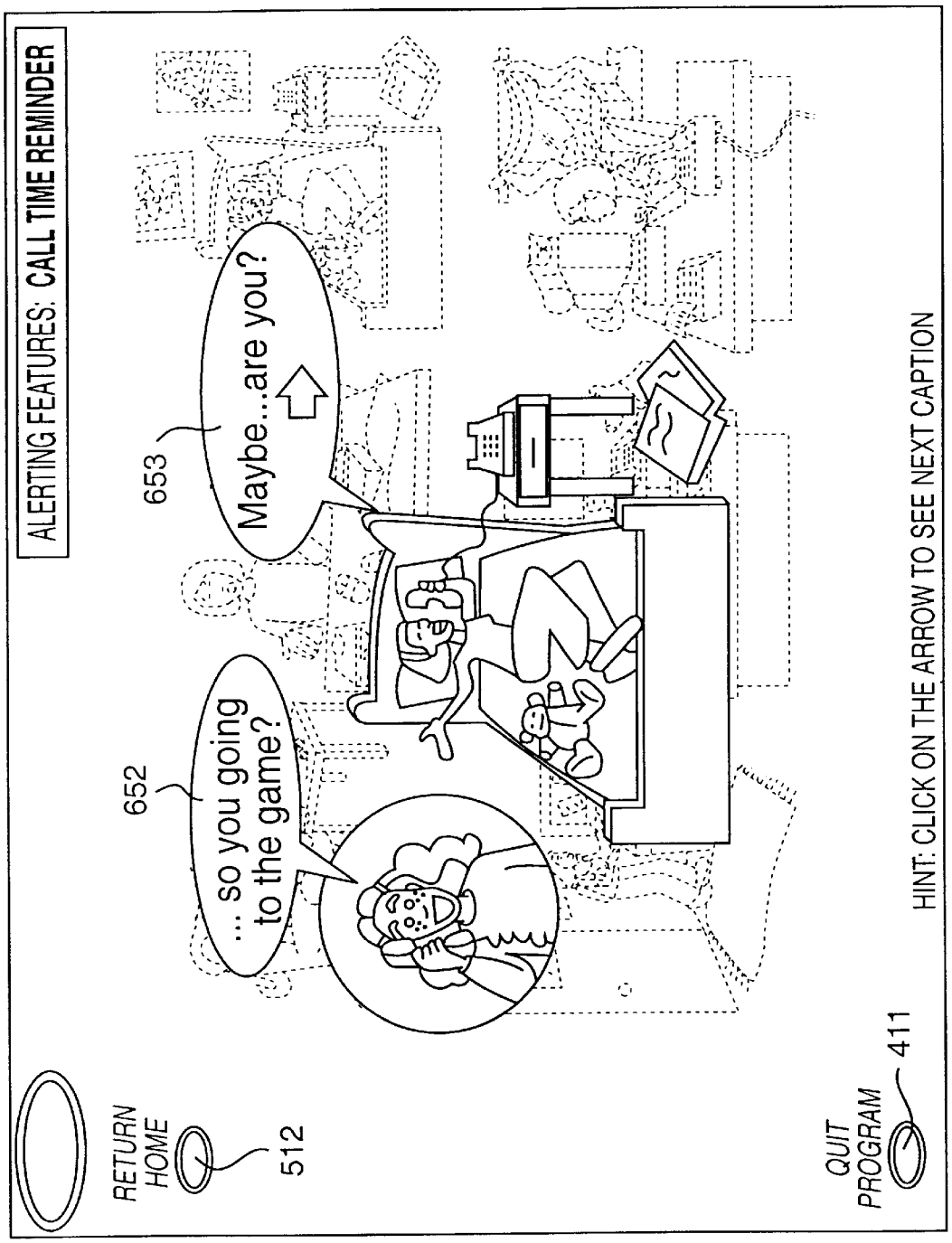
FIGS. 6–8 are drawings of displays of a story associated with a story from FIG. 4.
Figure 7:
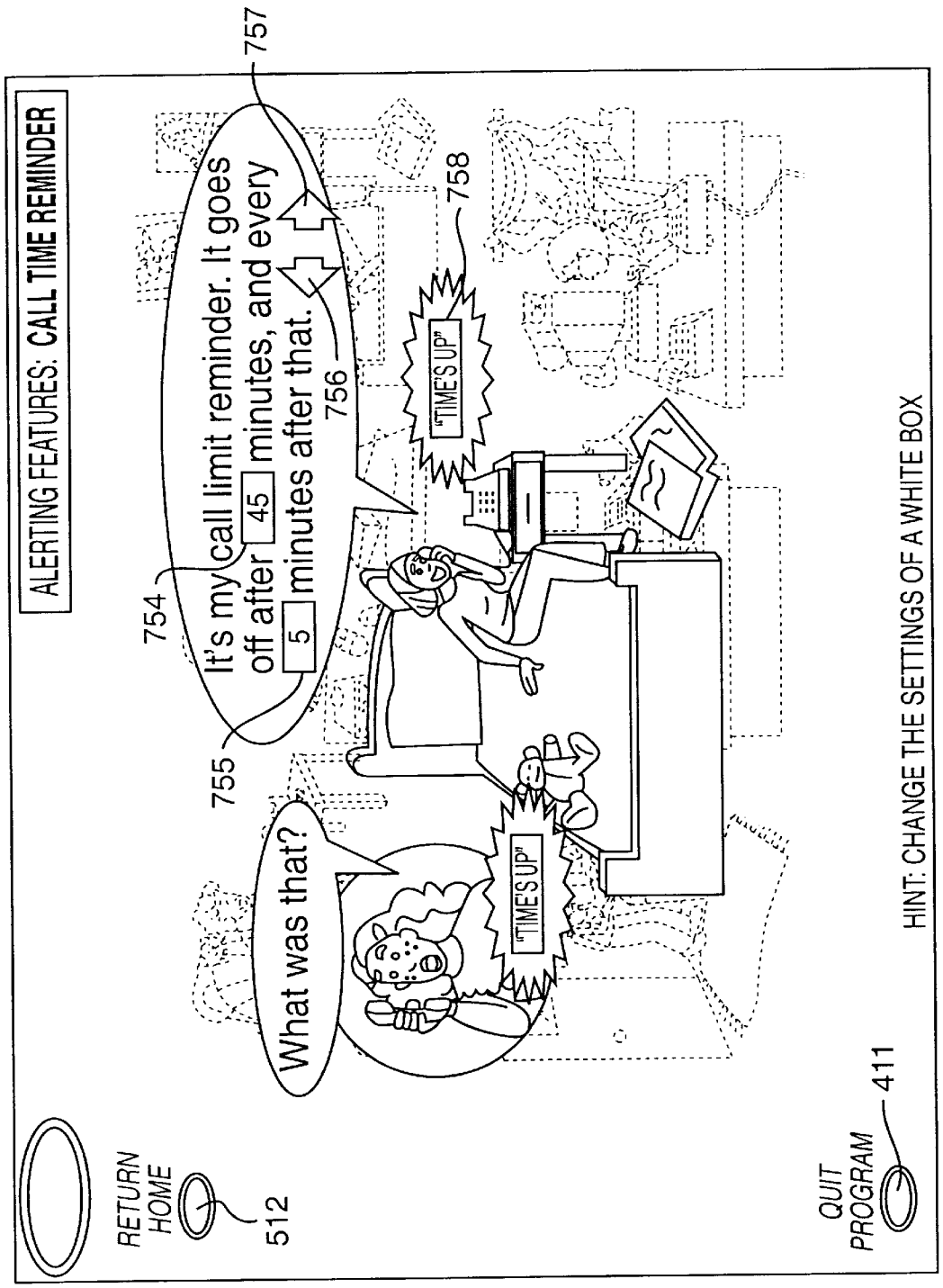

If the user selects story 550, program 107 displays that story, as shown in FIG. 6 (step 225). The flow of the story display is shown with more detail in FIG. 3. As shown in FIG. 6, the story depicts the context in which the product or service will be used (step 300). The story is preferably animated and narrated using voice bubbles 652 and 653. Again, the user may quit program 107 (step 245) or return to the home page (step 255). Otherwise, the story continues, and the next screen is shown in FIG. 7. The settings available in story 550 are shown in boxes 754, 755 and 758 (step 305). In story 550, the user learns that the call limit reminder may be set to go off after a variable time and thereafter repeat at a predetermined interval. The user can alter these settings by selecting and modifying boxes 754 and 755 (step 310). The user can also change the type of reminder by selecting and modifying box 758 (step 310). The user proceeds forward or backward through the story by selecting arrows 756 or 757.

Figure 8:
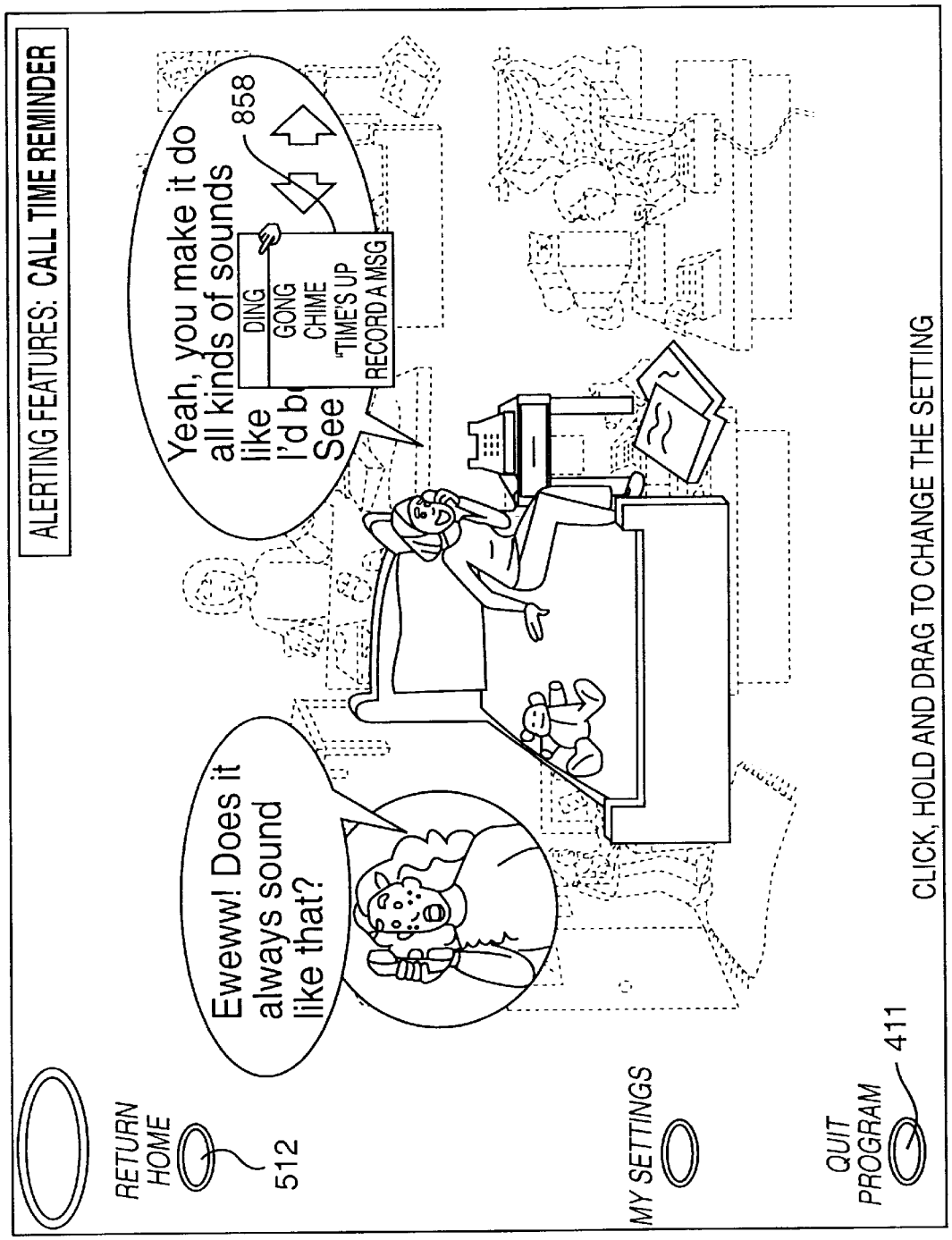

FIG. 8 shows another segment of story 550. Prior to the display of this screen, program 107 has given a time call reminder warning. That warning is displayed on the screen in a box, which means that the warning is a programmable feature. The user may access a pull-down menu 858 to change the type of warning, for example, a chime or a personalized recorded message (step 310). As the user scrolls through the settings, program 107 shows the effect of the different warnings in the story (step 315). Here, program 107 plays the actual audio warnings heard by the phone users if the conversation exceeded the pre-selected time limit.

Figure 9:
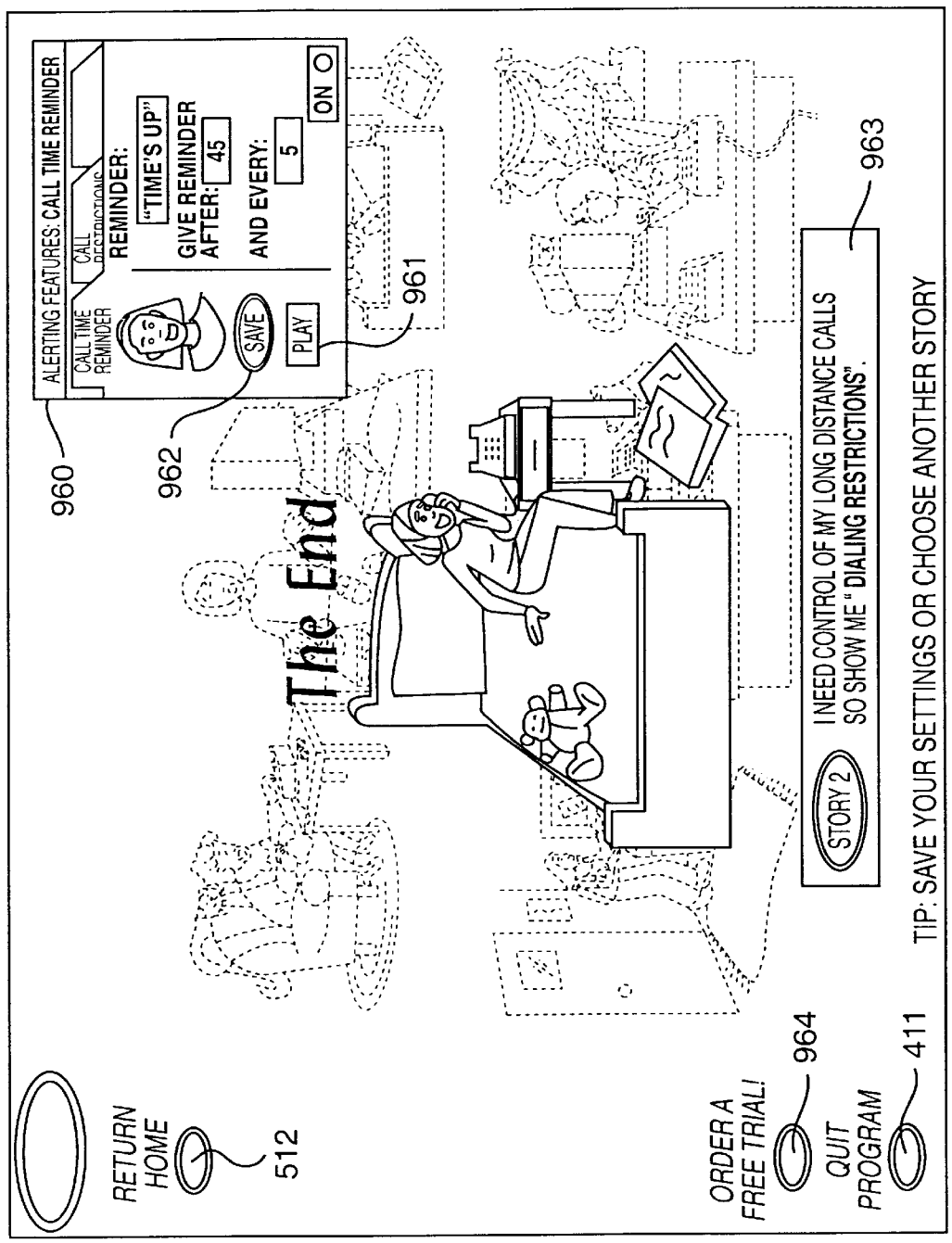
FIG. 9 is a drawing of a display of a summary box for a story.

FIG. 9 shows the conclusion of story 550 (step 320). A summary box 960 appears (step 227) and shows the various features displayed throughout story 550. The features, call time reminder and call restrictions, are tabbed. The user can configure these features in summary box 960 as during the story. The user can also replay the story by selecting the play button 961, and can save the settings (step 250) by selecting a save button 962. Program 107 saves the settings as a text file associated with the user, or in any other suitable format. This procedure has the benefit of allowing multiple users to customize the features of the same product or service. By maintaining a file for each user, the program can quickly access stored settings and configure the device according to that particular user's preferences.

Figure 10:
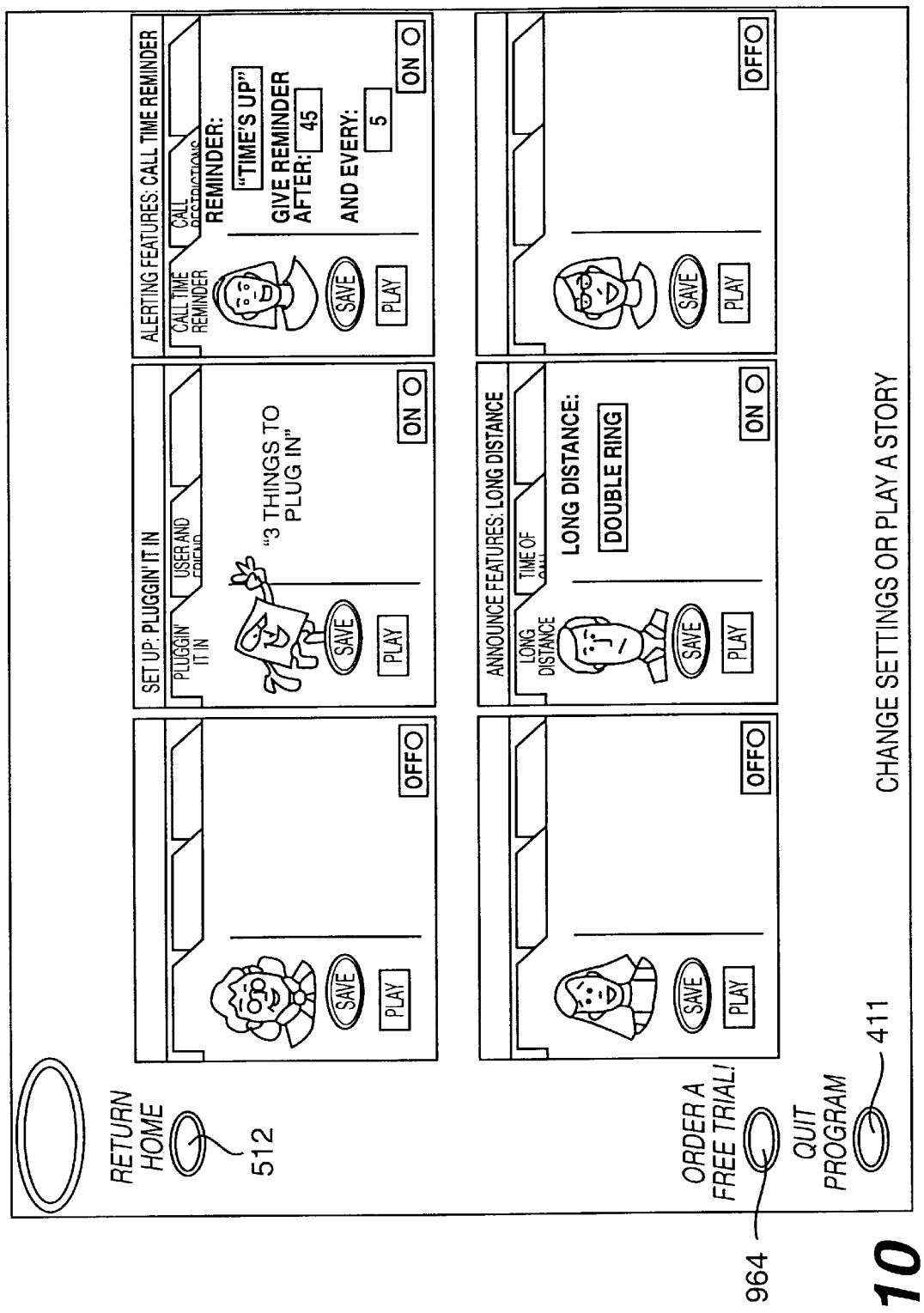
FIG. 10 is a drawing of a display of summary boxes for all the feature scene categories of FIG. 3.

The user can proceed with the other story associated with this feature scene category (step 220) by selecting box 963 at the bottom of the screen. Moreover, as shown in FIG. 10, program 107 can display summary boxes (step 235) for each of the six feature scene categories 415, 420, 425, 430, 435, and 440 of FIG. 4. The user can thus access all programmable features of the product from this screen.

Figure 11:
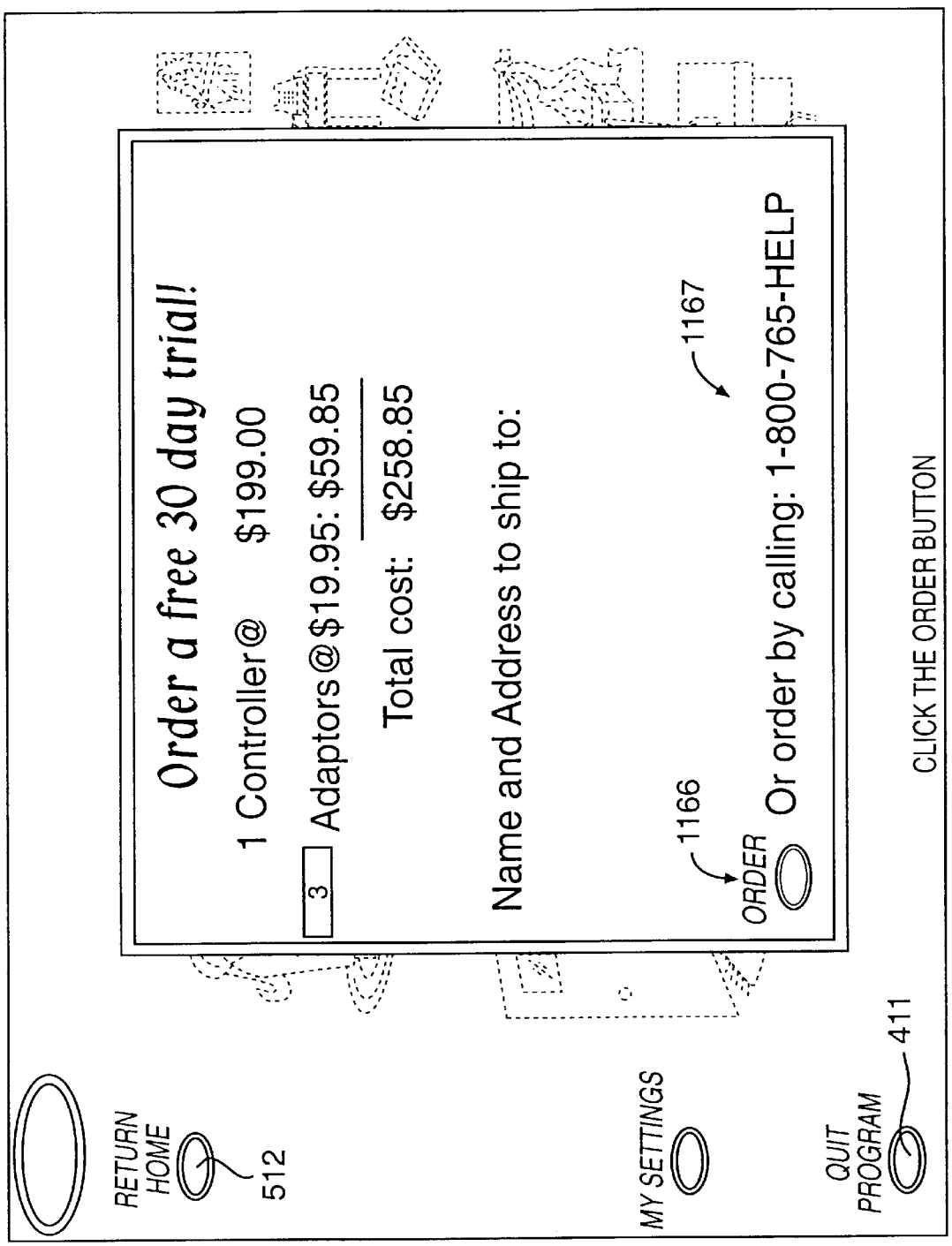
FIG. 11 is a drawing of a display of an order page.

Preferably, the user can go to the order page shown in FIG. 11 (step 230) at any time to purchase the product or service. The order screen shows information about the cost of the product and allows the user to order the product. In this example, the product consists of an adapter for each phone and a controller.

Clicking button 1166 establishes a link to the seller of the product and program 107 transmits the order information to the seller. Alternatively, the user can call a number 1167 displayed at the bottom of the screen to order the product.

Once the product arrives, all the settings made by the user while viewing the stories, if saved, will be available to program 107 to quickly configure the product's features. The stored settings, however, may be used in any phase of product delivery. For example, the seller of the product may pre-configure the product according to the stored settings prior to delivering the product to the user.

The link allowing computer 100 to interact with the product or service to configure selected features will vary according to the product or service the program is supporting and how the program is used. For a properly configured product, any suitable communication link between it and the computer, such as a Universal Serial Bus (USB) or RS-232 link, could be used. For a service, configuration data could be transmitted directly to the service provider by any suitable means, such as electronically over a phone line. The software that downloads the data could be part of program 107 or stand-alone software supplied by the product or service's vendor.

It will be apparent to those skilled in the art that various modifications and variations can be made in the present invention without departing from its spirit or scope. For example, a single program could be configured to support multiple products or services, such as in a home automation system. In such a system, the home page of the program could be modified to provided a selection of the different products or services. Also, if the system running the program did not have a display device, the program could interact with the user through audio only. Thus, it is intended that the present invention cover the modifications and variations of this invention provided they come within the scope of the appended claims and their equivalents.

We claim:

1. A method of obtaining settings for a configurable element from an interactive demonstration of the configurable element, the method comprising the steps of:
   presenting a programmed demonstration of the configurable element;
   receiving selections from a user indicating settings for features of the configurable element;
   modifying the programmed demonstration according to the received selections;
   recording the received selections; and
   configuring the configurable element according to the received selections.

2. The method of claim 1 wherein the recording step includes the step of
   recording the selections in a file associated with the user.

3. The method of claim 1 further including the step of selecting between two or more configurable elements to be configured.

4. The method of claim 1 wherein the presenting step includes the step of
   presenting one or more animated stories to demonstrate features of the configurable element.

5. The method of claim 1 further including the step of receiving an order for the configurable element.

6. The method of claim 1 further including the step of presenting a summary of features of the configurable element.

7. The method of claim 1 further including the step of printing the received selections.

8. The method of claim 7 wherein the printing step includes the step of
   printing documentation instructing the user on how to configure the configurable element.

9. The method of claim 1 wherein the step of configuring includes the step of
   configuring a telephone.

10. The method of claim 1 wherein the configuring step comprises the step of
    changing the configuration of the configurable element according to received selections.

11. The method of claim 1 wherein the configuring step includes the step of
    configuring the configurable element prior to receipt of the configurable element by the user.

12. The method of claim 1 wherein the configuring step comprises the step of
    configuring a plurality of configurable elements with the received selections.

13. The method of claim 1 wherein the receiving step includes the step of
    receiving selections from at least two users for the same configurable element.

14. The method of claim 13 wherein the recording step includes the step of
    recording the selections from the at least two users in files respectively associated with the users.

15. A system for obtaining settings for a configurable element from an interactive demonstration of the configurable element comprising:
    means for presenting a programmed demonstration of the configurable element;
    means for receiving selections from a user indicating settings for features of the configurable element;
    means for modifying the programmed demonstration according to the received selections;
    means for recording the received selections; and
    means for configuring the configurable element according to the received selections.

16. The system of claim 15 wherein the recording means includes
    means for recording the received selections in a file associated with the user.

17. The system of claim 15 further including
    means for configuring prior to transfer of the configurable element to the user.

18. The system of claim 15 further including
    means for selecting between two or more configurable elements to be configured.

19. The system of claim 15 wherein the presenting means includes
    a display for displaying one or more animated stories to demonstrate features of the configurable element.

20. The system of claim 15 further including means for receiving an order for the configurable element.

21. The system of claim 15 further including a printer for printing a hard copy of the received selections.

22. The system of claim 15 further including a printer for printing documentation informing the user on how to configure the configurable element.

23. The system of claim 15 wherein the means for receiving includes means for receiving selections from at least two users for the same configurable element.

24. The system of claim 23 wherein the recording means includes means for recording selections from the at least two users in files respectively associated with the users.

25. A method of obtaining settings for a configurable element from an interactive demonstration of the configurable element, the method comprising the steps of:

presenting one or more programmed demonstrations showing the context for features of the configurable element;

presenting with the demonstrations one or more sets of selectable features of the configurable element;

receiving selections of features in the sets from a user;

modifying the programmed demonstration to show the consequences of the received selections; and configuring the configurable element with the received selections.

26. The method of claim 25 further including the step of recording the received selections in a file associated with the user.

27. The method of claim 25 wherein the step of presenting one or more programmed demonstrations includes the step of presenting demonstrations for each of a plurality of subsets of features for the configurable element.

28. The method of claim 25 further including the step of selecting between a plurality of configurable elements to be configured.

29. The method of claim 25 wherein the step of presenting one or more programmed demonstrations includes the step of presenting one or more stories.

30. The method of claim 29 wherein the step of presenting one or more stories includes the step of presenting one or more animated stories.

31. The method of claim 30 wherein the step of presenting one or more animated stories includes the step of narrating the animated stories.

32. The method of claim 29 wherein the modifying step includes the step of modifying the stories to show the consequences of received selections.

33. A system for obtaining settings for a configurable element from an interactive demonstration of the configurable element comprising:

means for presenting one or more programmed demonstrations showing the context for features of the configurable element;

means for presenting with the demonstrations one or more sets of selectable features of the configurable element;

means for receiving selections of features in the sets from a user;

means for modifying the programmed demonstration to show the consequences of the received selections; and means for configuring the configurable element with the received selections.

34. The system of claim 33 further including means for recording the received selections in a file associated with the user.

35. The system of claim 33 wherein the means for presenting one or more programmed demonstrations includes means for presenting demonstrations for each of a plurality of subsets of features for the configurable element.

36. The system of claim 33 further including means for selecting between a plurality of configurable elements to be configured.

37. The system of claim 33 wherein the programmed demonstrations are stories.

38. The system of claim 37 wherein the stories are animated stories.

39. The system of claim 38 further including means for narrating the animated stories.

40. The system of claim 39 wherein the modifying means includes means for modifying the narration of the animated stories based on the received selections.

41. An article of manufacture comprising:

a first module for causing a system to present a programmed demonstration of a configurable element;

a second module for causing the system to receive selections from a user indicating settings for features of the configurable element;

a third module for causing the system to modify the programmed demonstration according to the received selections;

a fourth module for causing the system to record the received selections; and a fifth module for causing the system to configure the configurable element according to the received selections.

42. The article of manufacture according to claim 41 wherein the first module includes a submodule for causing the system to display one or more animated stories to demonstrate features of the configurable element.

* * * * *